United States Patent

(12) United States Patent
Zhu et al.

(10) Patent No.: US 9,628,212 B2
(45) Date of Patent: Apr. 18, 2017

(54) SIGNAL TIMING IN DEVICE-TO-DEVICE COMMUNICATION

(71) Applicant: FUJITSU LIMITED, Kawasaki-shi, Kenagawa (JP)

(72) Inventors: Chenxi Zhu, Fairfax, VA (US); Dorin Viorel, Calgary (CA); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 394 days.

(21) Appl. No.: 14/094,522

(22) Filed: Dec. 2, 2013

(65) Prior Publication Data

US 2014/0269668 A1    Sep. 18, 2014

Related U.S. Application Data

(60) Provisional application No. 61/785,898, filed on Mar. 14, 2013.

(51) Int. Cl.
| | |
|---|---|
| *H04L 12/66* | (2006.01) |
| *H04J 3/07* | (2006.01) |
| *H04W 4/00* | (2009.01) |
| *H04L 5/14* | (2006.01) |
| *H04W 56/00* | (2009.01) |

(52) U.S. Cl.
CPC .............. *H04J 3/07* (2013.01); *H04L 5/1469* (2013.01); *H04W 4/005* (2013.01); *H04W 56/002* (2013.01)

(58) Field of Classification Search
CPC .................................................. H04W 4/005
USPC ........................................................ 370/350
See application file for complete search history.

(56) References Cited

U.S. PATENT DOCUMENTS

| | | |
|---|---|---|
| 5,943,326 A | 8/1999 | Schroderus |
| 2011/0255450 A1 | 10/2011 | Wang et al. |

(Continued)

FOREIGN PATENT DOCUMENTS

| | | |
|---|---|---|
| JP | 2016-509795 A | 3/2016 |
| WO | 2011/085396 A1 | 7/2011 |

(Continued)

OTHER PUBLICATIONS

W. Shin et al., "Device-to-device communication assisted interference mitigation for next generation cellular networks" Consumer Electronics (ICCE), 2013 IEEE International Conference on, Jan. 11-14, 2013.

(Continued)

*Primary Examiner* — Mark Rinehart
*Assistant Examiner* — Matthew Hopkins
(74) *Attorney, Agent, or Firm* — Maschoff Brennan

(57) ABSTRACT

A method of compensating for transmitting to multiple devices during device-to-device (D2D) communications may include determining that a receiving wireless device of a device-to-device (D2D) pair may experience a timing conflict. The timing conflict may be with respect to the receiving wireless device receiving at least a portion of a D2D communication transmitted by a transmitting wireless device of the D2D pair while the receiving wireless device is transitioning between a transmitting mode and a receiving mode. The method may also include adjusting the D2D communication to compensate for the timing conflict.

16 Claims, 6 Drawing Sheets

(56) References Cited

U.S. PATENT DOCUMENTS

| | | | | |
|---|---|---|---|---|
| 2011/0268004 | A1* | 11/2011 | Doppler | H04W 72/02 370/311 |
| 2013/0170387 | A1* | 7/2013 | Wang | H04W 4/005 370/252 |
| 2014/0314057 | A1* | 10/2014 | Van Phan | H04W 56/0045 370/336 |
| 2015/0078466 | A1* | 3/2015 | Zhou | H04W 56/004 375/260 |
| 2015/0341150 | A1* | 11/2015 | Seo | H04B 7/2656 370/336 |

FOREIGN PATENT DOCUMENTS

| | | |
|---|---|---|
| WO | 2012/057547 A2 | 5/2012 |
| WO | 2013/032251 A2 | 3/2013 |
| WO | 2014/101234 A1 | 7/2014 |

OTHER PUBLICATIONS

International Search Report and Written Opinion dated Aug. 5, 2014 as received in Application No. PCT/US2014/027600.
MX Office Action dated Jul. 26, 2016 as received in Application No. MX/A/2015/011221 (English Translation).
European Search Report for corresponding application No. 14768204.1 mailed Oct. 31, 2016.
Japanese Office Action in corresponding application No. 2016-502489, mailed Sep. 29, 2016 (English Translation).

* cited by examiner

SIGNAL TIMING IN DEVICE-TO-DEVICE COMMUNICATION

CROSS-REFERENCE TO RELATED APPLICATIONS

This application is based upon and claims the benefit of priority of U.S. Provisional Application No. 61/785,898, filed on Mar. 14, 2013, the entire contents of which are incorporated herein by reference.

FIELD

The present disclosure relates to signal timing in device-to-device (D2D) communication.

BACKGROUND

The proliferation of smartphones, tablets, laptop computers and other electronic devices (referred to generally as "wireless devices") that use wireless communication networks has created an increasing demand for ubiquitous and continuous wireless voice and data access. Device-to-device (D2D) communication may help satisfy this demand. For example, D2D communication may be performed between wireless devices and may allow the wireless devices to communicate information with each other. This D2D communication may allow for reuse of wireless communication resources, which may help satisfy the demand for wireless voice and data access.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of compensating for transmitting to multiple devices during device-to-device (D2D) communications may include determining that a receiving wireless device of a device-to-device (D2D) pair may experience a timing conflict. The timing conflict may be with respect to the receiving wireless device receiving at least a portion of a D2D communication transmitted by a transmitting wireless device of the D2D pair while the receiving wireless device is transitioning between a transmitting mode and a receiving mode. The method may also include adjusting the D2D communication to compensate for the timing conflict.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
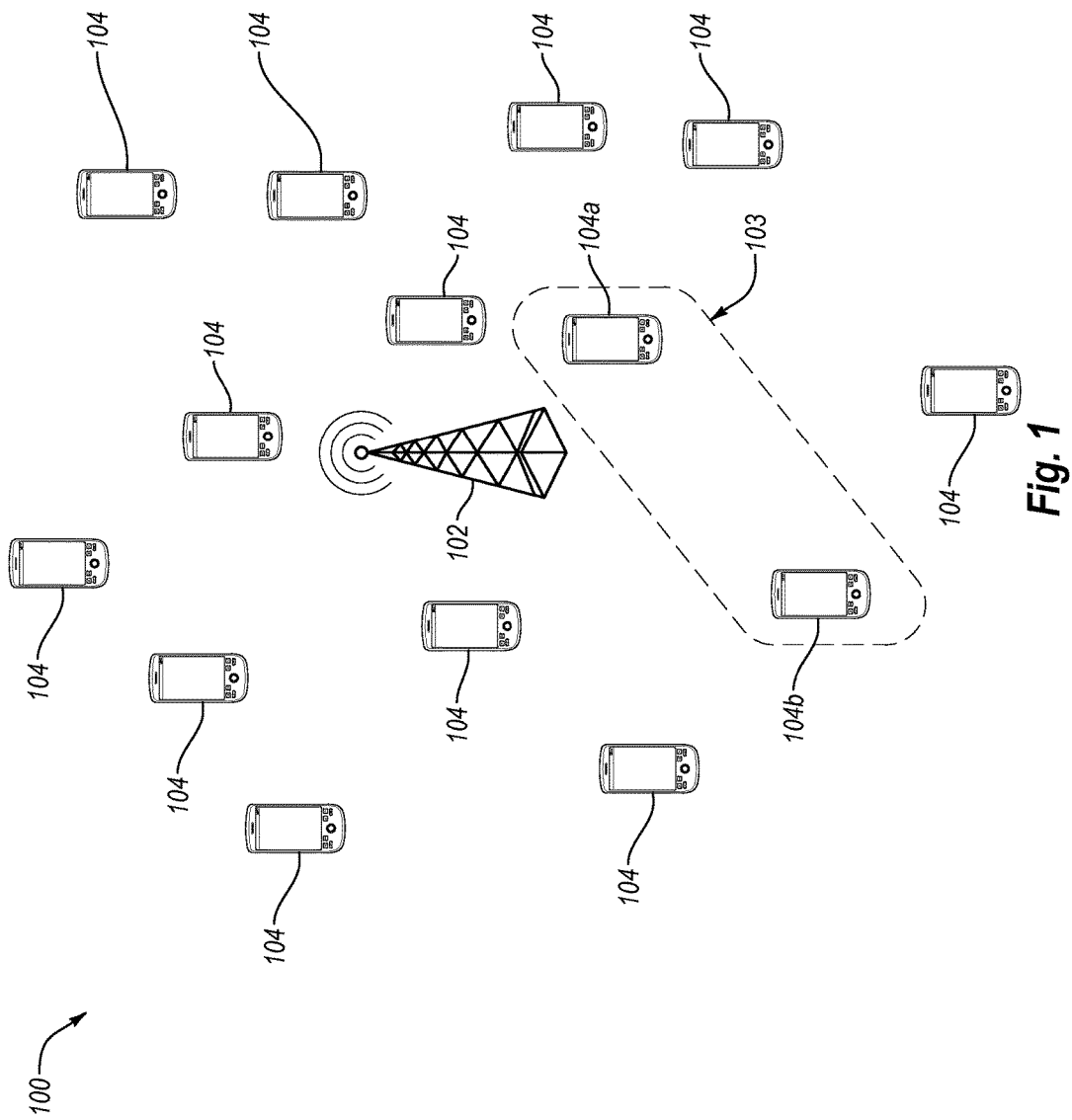
FIG. 1 illustrates an example wireless communication network configured for device-to-device (D2D) communication between wireless devices.

In particular embodiments, and, as described in further detail below, a wireless communication network may be configured to allocate wireless communication resources (e.g., frequency bands, time slots, etc.) to one or more device-to-device (D2D) pairs to facilitate D2D communication. Facilitating D2D communication may allow for lower power communication between the wireless devices themselves and/or the wireless devices and an access point of the wireless communication network. Lower power communication may allow for reuse of a limited frequency band by localizing the use of each frequency band between the wireless devices participating in D2D communication.

In some instances, a receiving wireless device of a D2D pair may transition between receiving D2D communications from a transmitting wireless device of the D2D pair and transmitting uplink communications to a wireless communication network access point. The transition between a receiving mode and a transmitting mode may take a certain amount of time in which the receiving wireless device of the D2D pair may not be able to receive wireless communications. In some instances, however, the transmitting wireless device may transmit a D2D communication to the receiving wireless device such that the receiving wireless device may receive at least a portion of the D2D communication during the transition period.

In some embodiments, when a receiving wireless device receives at least a portion of a D2D communication during a transition period, it may be determined that the receiving wireless device may experience a timing conflict with respect to receiving a portion of the D2D communication. Additionally, the D2D communication may be adjusted to compensate for the timing conflict. In some embodiments, one or more symbols of the D2D communication may be adjusted to compensate for the timing conflict.

Further, the timing conflict may occur when the receiving wireless device is transitioning from the receiving mode to the transmitting mode or may occur when the receiving wireless device is transitioning from the transmitting mode to the receiving mode. In some embodiments, when the receiving wireless device is transitioning from the receiving mode to the transmitting mode, one or more of the latter symbols of the D2D communication may be dropped or included with null information to compensate for the timing conflict. In these and other embodiments, when the receiving wireless device is transitioning from the transmitting mode to the receiving mode, one or more of the first symbols of the D2D communication may be dropped or included with null information to compensate for the timing conflict.

The terms "receiving wireless device" and "transmitting wireless device" used herein refer to the relationship of wireless devices in a D2D pair with respect to D2D communications transmitted from the transmitting wireless device to the receiving wireless device. The terms do not imply that a receiving wireless device is only configured to receive wireless communications or that a transmitting wireless device is only configured to transmit wireless communications. As such, a receiving wireless device of a D2D pair may act as a transmitting device of the D2D pair or a transmitting device of another D2D pair, or vice versa.

Embodiments of the present disclosure will be explained with reference to the accompanying drawings.

FIG. 1 illustrates an example wireless communication network 100 (referred to hereinafter as "network 100") configured to control D2D communications between wireless devices, arranged in accordance with at least one embodiment described herein. The network 100 may be configured to provide wireless communication services to one or more wireless devices 104 via one or more access points 102. The wireless communication services may be voice services, data services, messaging services, and/or any suitable combination thereof. The network 100 may include a Frequency Division Multiple Access (FDMA) network, an Orthogonal FDMA (OFDMA) network, a Code Division Multiple Access (CDMA) network, a Time Division Multiple Access (TDMA) network, and/or any other suitable wireless communication network. In some embodiments, the network 100 may be configured as a third generation (3G) wireless communication network and/or a fourth generation (4G) wireless communication network. In these or other embodiments, the network 100 may be configured as a long-term evolution (LTE) wireless communication network.

The access point 102 may be any suitable wireless communication network communication point and may include, by way of example but not limitation, a base station, an evolved node "B" (eNB) base station, a remote radio head (RRH), or any other suitable communication point. The wireless devices 104 may include any device that may use the network 100 for obtaining wireless communication services and may include, by way of example and not limitation, a cellular phone, a smartphone, a personal data assistant (PDA), a laptop computer, a personal computer, a tablet computer, or any other similar device that uses wireless communication services.

In some embodiments, as mentioned above, the network 100 may be configured to supervise D2D communication between wireless devices 104. In some of these embodiments, the access point 102 may be configured to allocate wireless communication resources to a D2D pair. In some embodiments, the wireless communication resources may be assigned to the D2D pairs during a determination of D2D transmission parameters such as that described in U.S. patent application Ser. No. 13/830,342 by Zhu et al., filed on Mar. 14, 2013, and entitled "NETWORK SUPERVISED DEVICE-TO-DEVICE COMMUNICATION," the entire contents of which are incorporated herein by reference.

Additionally, in some embodiments, the D2D pair may be selected based on neighbor discovery such as described in U.S. patent application Ser. No. 13/828,457 by Zhu et al., filed on Mar. 14, 2013 and entitled "NETWORK SUPERVISED WIRELESS DEVICE NEIGHBOR DISCOVERY" and such as described in U.S. patent application Ser. No. 13/828,617 by Zhu et al., filed on Mar. 14, 2013 and entitled "POWER CONTROL OF NEIGHBOR DISCOVERY SIGNALS," the entire contents of both of which are incorporated herein by reference.

For example, a wireless device 104a and a wireless device 104b may be configured as a D2D pair 103, and the access point 102 may be configured to allocate wireless communication resources to the D2D pair 103 of the wireless devices 104a and 104b. In the illustrated example, the wireless device 104a may be configured to transmit D2D signals to the wireless device 104b such that the wireless device 104b may receive the D2D signals. Therefore, the wireless device 104a may be referred to as a "transmitting wireless device 104a" with respect to the D2D pair 103 and the wireless device 104b may be referred to as a "receiving wireless device 104b" with respect to the D2D pair 103 in the illustrated example.

In some embodiments, the access point 102 may direct the transmitting wireless device 104a to transmit the D2D signals using uplink channel resources (e.g., time slots, frequencies, etc.) that may also be used by one or more other wireless devices 104 to communicate information to the access point 102. In some embodiments, the transmitting wireless device 104a may transmit the D2D signals using radio frames that may be part of a communication protocol structure used for communication in the network 100.

In some embodiments, the access point 102 may be configured to determine that the receiving wireless device 104b may experience a timing conflict with respect to receiving a D2D communication from the transmitting wireless device 104a. In these and other embodiments, the access point 102 may direct the transmitting wireless device 104a to adjust the D2D communication to compensate for the timing conflict. As a result, the access point 102 may be configured to determine a configuration of D2D signals and their respective radio frames that may reduce issues related to the timing of reception of the D2D signals by the receiving wireless device 104b.

Figure 2:
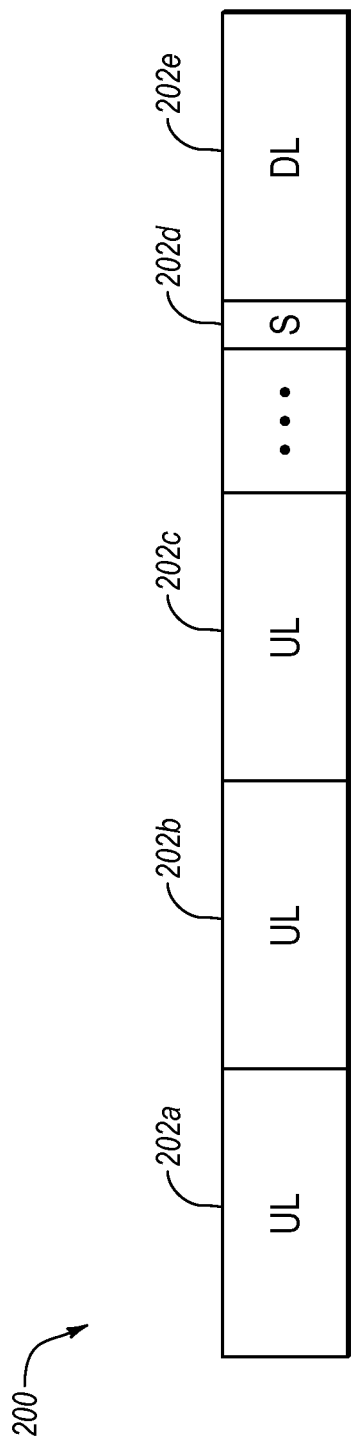
FIG. 2 illustrates a radio frame that may be part of a communication protocol structure used for communication in a wireless communication network.

FIG. 2 illustrates a radio frame 200 (referred to herein as "frame 200") that may be part of the communication protocol structure used for communication in a wireless communication network, such as the network 100 of FIG. 1, arranged in accordance with at least one embodiment described herein. The frame 200 may include sub-frames 202a, 202b, 202c, 202d, and 202e, referred to herein collectively as sub-frames 202. The sub-frames 202 may be designated as uplink (UL) sub-frames, downlink (DL) sub-frames, and/or special (S) sub-frames. The frame 200 and the sub-frames 202 may correspond to a designated amount of time for communicating information.

During uplink sub-frames, communications may be sent from a wireless device to an access point. During downlink sub-frames, communications may be sent from an access point to a wireless device. During special sub-frames, control communications may be sent or the special sub-frames may allow the wireless devices in the network to transition between being configured to transmit to being configured to receive or vice versa. During an up-link or downlink sub-frame, D2D communications may be sent between a D2D pair of wireless devices. The uplink and/or downlink sub-frames may be clustered or spread out within the frame 200.

Figure 3:
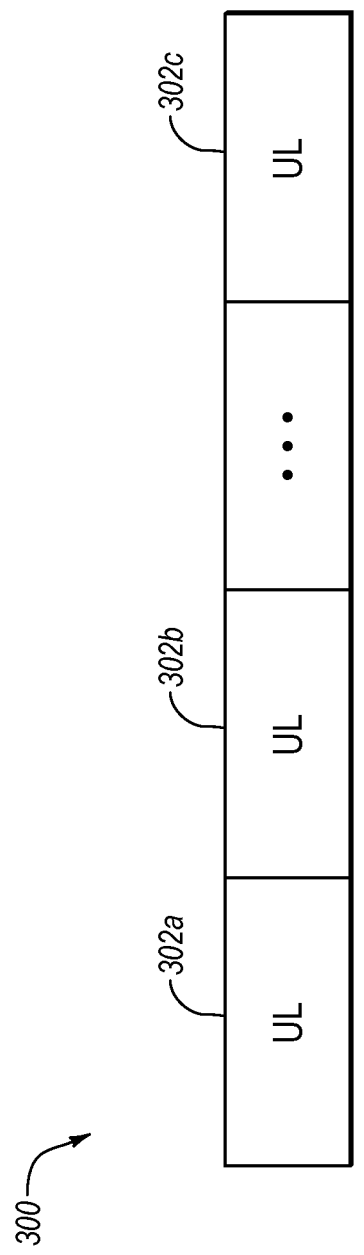
FIG. 3 illustrates an uplink sub-frame that may be part of the radio frame of FIG. 2.

FIG. 3 illustrates an uplink sub-frame 300 (referred to herein as "sub-frame 300"), arranged in accordance with at least one embodiments described herein. During the sub-frame 300, information may be communicated from one device to another device, for example, from a transmitting wireless device of a D2D pair to a receiving wireless device of the D2D pair or from a wireless device to an access point.

In some embodiments, the information may be communicated using symbols 302a, 302b, 302c (referred to herein as symbols 302). A symbol may be a waveform, a state, or a significant condition of a communication channel that persists for a fixed period of time, upon which data may be transmitted. The symbols 302 may be orthogonal frequency-division multiplexing (OFDM) symbols, single carrier frequency division multiple access (SC-FDMA) symbols, orthogonal frequency-division multiple access (OFDMA) symbols, among other types of symbols.

The transmission of each of the symbols may consume a portion of the sub-frame 300. For example, in some embodiments, the sub-frame 300 may include 4, 6, 8, 10, 12, 14, 16, or 20 or more symbols. During a sub-frame 300, some of the symbols 302 may convey data information and some of the symbols 302 may convey control information.

In some embodiments, when information is communicated using symbols, a receiving device (e.g., a wireless device 104 or the access point 102 of FIG. 1) may have a timing window, during which a symbol may be received by the receiving device and properly decoded. When a communication is received outside the receiving window, the receiving device, in some circumstance, may be unable to decode the symbols within the communication. Thus, during communications between a transmitting and receiving device, a transmitting device (e.g., a wireless device 104 or the access point 102 of FIG. 1) and a receiving device may be substantially synchronized such that a transmission from the transmitting device may be received by the receiving device during the receiving window of the receiving device. Because the transmitting device and the receiving device in a network, such as the network 100 of FIG. 1, are not typically located proximate to one another, a transmission from a transmitting device may not instantaneously or almost instantaneously arrive at the receiving device. The delay from when a transmission is sent by a transmitting device to when the transmission is received by a receiving device may be referred to as a propagation delay.

As a result of propagation delay between transmitting and receiving devices, a transmitting device may send a transmission before the receiving window of the receiving device so that the receiving device may receive the transmission during the receiving window. The amount of time that the transmitting device may transmit a transmission before the receiving window of the receiving device may be referred to as a time adjust "TA." The time adjust for a transmission may be determined based on the propagation delay between the transmitting device and the receiving device. For example, in some embodiments, the time adjust for a transmission may be equal to the propagation delay between a transmitting device and a receiving device.

Figure 4:
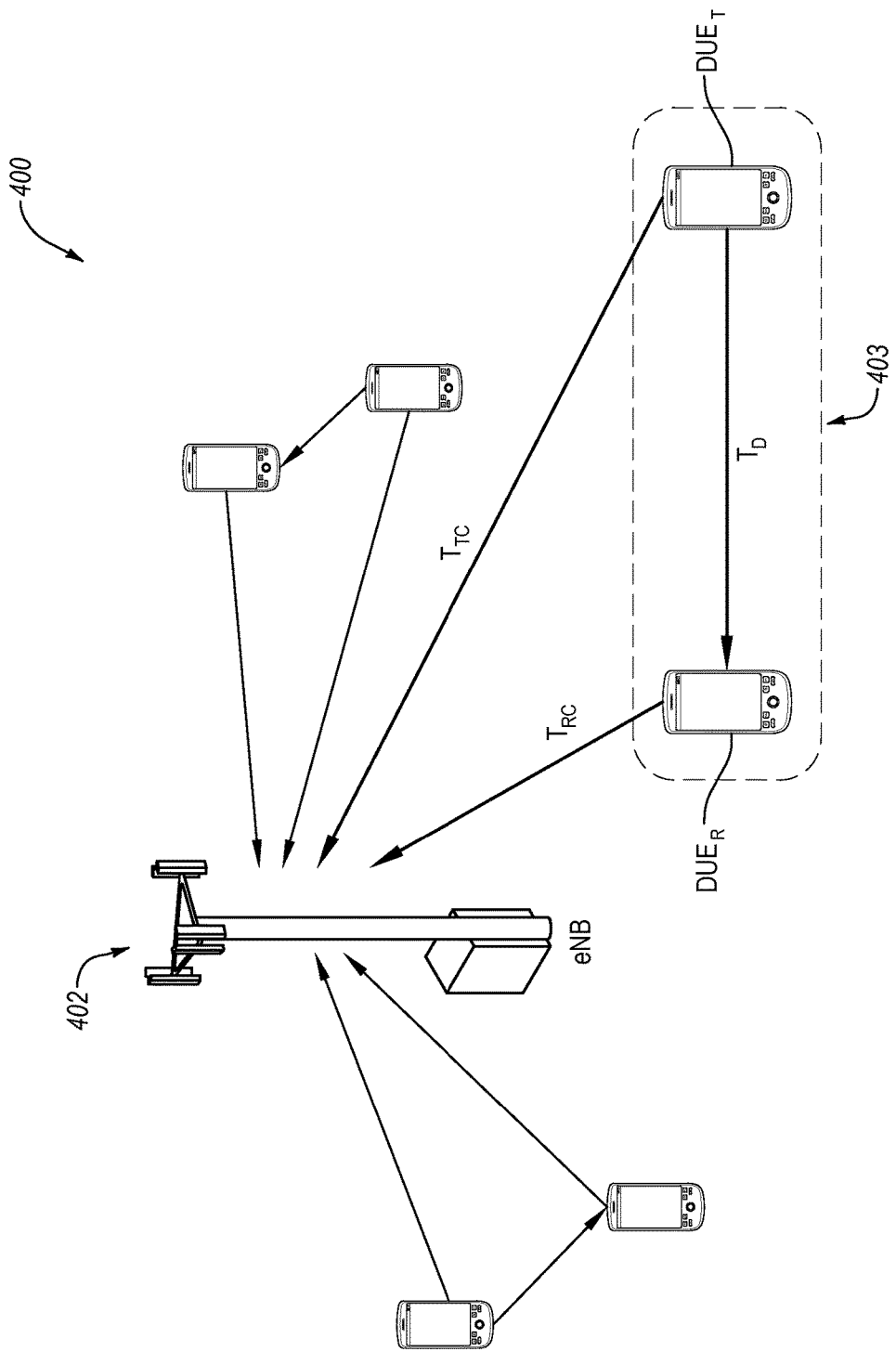
FIG. 4 illustrates an example wireless communication network that includes a D2D pair and an access point.

FIG. 4 illustrates an example wireless communication network 400 (referred to hereinafter as "the network 400") that includes a D2D pair 403 and an access point 402, arranged in accordance with at least one embodiment described herein. In the illustrated embodiment, the transmitting wireless device of the D2D pair 403 is indicated by "$DUE_T$" and the receiving wireless device of the D2D pair 403 is indicated by "$DUE_R$." FIG. 4 further illustrates propagation delays for signals transmitted between the access point 402, the $DUE_R$, and the $DUE_T$. In the illustrated embodiment, the propagation delay between the $DUE_T$ and the $DUE_R$ is represented by "$T_D$," the propagation delay between the $DUE_R$ and the access point 402 is represented by "$T_{RC}$," and the propagation delay between the $DUE_T$ and the access point 402 is represented by "$T_{TC}$."

In the illustrated embodiment of FIG. 4, the $DUE_R$ and the $DUE_T$ may both be communicating with the access point 402. When establishing communication with the access point 402, the propagation delays $T_{RC}$ and $T_{TC}$ may be determined. Using their respective propagation delays $T_{TC}$ and $T_{RC}$ to the access point 402, the $DUE_T$ and the $DUE_R$ may time adjust their transmissions to the access point 402 as well as synchronize with the access point 402 so that the access point 402 may know when transmissions may be received by the $DUE_R$ and $DUE_T$.

In some embodiments, the $DUE_T$ may be configured to transmit signals to both the access point 402 and the $DUE_R$ at the same time, e.g., during the same sub-frame. Time adjusts for transmission used by the $DUE_T$ when transmitting to the access point 402 and to the $DUE_R$ may be different, however, because the propagation delays $T_D$ and $T_{TC}$ may be different. Thus, when the $DUE_T$ is transmitting to both the access point 402 and the $DUE_R$ at the same time, the $DUE_T$ may select a time adjust based on either the propagation delay $T_{TC}$ or the propagation delay $T_D$. In some embodiments, because other wireless devices may be communicating with the access point 402 along with the $DUE_T$, the $DUE_T$ may select a time adjust based on the propagation delay $T_{TC}$ when communicating with both the access point 402 and the $DUE_R$ at the same time.

When the $DUE_R$ and the $DUE_T$ are paired as the D2D pair 403 using neighbor discovery as indicated above or paired using some other methodology, the propagation delay $T_D$ between the $DUE_R$ and the $DUE_T$ may not have been determined. Furthermore, the $DUE_R$ may be unaware of when the $DUE_T$ may start transmitting a signal within a particular uplink sub-frame based on the time adjust between the $DUE_T$ and the access point 402. The $DUE_R$ may be aware of a particular uplink sub-frame when a D2D communication may be received from the $DUE_T$ based on information received from the access point 402, but the $DUE_R$ may not know when a D2D transmission from the $DUE_T$ may be expected to be received within or around the particular uplink sub-frame.

To establish timing between the $DUE_R$ and the $DUE_T$ so that the $DUE_R$ may properly decode the symbols received in a D2D communication from the $DUE_T$, in some embodiments, the $DUE_R$ and/or the access point 402 may estimate a time that the $DUE_R$ may receive a D2D communication from the $DUE_T$. For example, in most cases the distance between the $DUE_T$ and the $DUE_R$ may be less than 1000 meters (m). As a result, the maximal difference between $T_{TC}$ and $T_{RC}$ ($|T_{TC}-T_{RC}|$) may be less than 10 microseconds (μs). Often the maximal difference between $T_{TC}$ and $T_{RC}$ may be much smaller than 10 μs. For example, when the distance between the $DUE_T$ and the $DUE_R$ is less than 100 m, $|T_{TC}-T_{RC}|$ may be less than 1 μs.

Thus, the access point 402 and/or the $DUE_R$ may estimate that the time adjust used by the $DUE_R$ when communicating with the access point 402 may be similar to the time adjust used by the $DUE_T$ when communicating with the access point 402 because the respective propagation delays of the $DUE_R$ and the $DUE_T$ ($T_{RC}$ and $T_{TC}$) may be relatively close. As a result, the $DUE_R$ may assume, or the access point 402 may instruct the $DUE_R$ to assume, that the $DUE_T$ may transmit a D2D communication to the $DUE_R$ at approximately the same time that the $DUE_R$ would transmit a communication to the access point 402 for an uplink sub-frame in which the $DUE_R$ may be scheduled to receive the D2D communication from the $DUE_T$. Furthermore, because the distance between the $DUE_R$ and the $DUE_T$ may be small, the propagation delay $T_D$ between the $DUE_R$ and the $DUE_T$ may be small. As such, the $DUE_R$ may estimate that a D2D communication may be received from the $DUE_T$ in a small window after the $DUE_R$ would transmit to the access point 402.

With the $DUE_R$ being able to estimate (or receive an estimation from the access point 402) when a D2D communication may be received, the $DUE_T$ may use a timing preamble during a first symbol of a D2D communication to the $DUE_R$ to allow the $DUE_R$ to better estimate the arrival of subsequent symbols in the D2D communication from the $DUE_T$. The timing preamble, in some embodiments, may occupy a first symbol of a D2D communication in an uplink sub-frame and may be based on a Zadoff-Chu sequence. The timing preamble may be used to reduce the interference and estimation error with respect to the arrival of subsequent symbols at the $DUE_R$ in a D2D communication. In these and other embodiments, the access point 402 may construct the timing preamble and may send the timing preamble to the $DUE_T$ in a control communication, such as a physical downlink control channel (PDCCH) communication. The access point 402 may also indicate to the $DUE_R$ that the D2D communication from the $DUE_T$ may include a timing preamble.

Alternately or additionally, the $DUE_T$ may be configured to send a timing preamble periodically on a schedule so that the $DUE_R$ is aware of when the timing preamble may be sent. In some embodiments, the D2D pair 403 may not use a timing preamble to provide estimated arrival time for D2D communications from the $DUE_T$ to the $DUE_R$. In these and other embodiments, the D2D pair 403 may use sounding reference signals (SRS) or other discovery signals to allow the $DUE_R$ or access point 402 to estimate arrival time for D2D communications from the $DUE_T$.

Because the $DUE_T$ uses the time adjust determined for uplink communications to the access point 402 for D2D communications to the $DUE_R$ and uplink communications to the access point 402, the $DUE_T$ may not experience timing conflicts between receiving and transmitting communications. The $DUE_R$, however, may have timing conflicts when multiple uplink sub-frames are adjacent in a frame, such as the sub-frame 202a and the sub-frame 202b being adjacent in the frame 200 of FIG. 2. In particular, the $DUE_R$ may experience a timing conflict when the $DUE_R$ is transmitting to the access point 402 during one of the uplink sub-frames (e.g. during the sub-frame 202a of FIG. 2) and receiving a D2D communication from the $DUE_T$ during another adjacent uplink sub-frame (e.g., during the sub-frame 202b of FIG. 2). Possible timing conflicts and solutions for avoiding the timing conflicts are illustrated in FIGS. 5 and 6.

Figure 5:
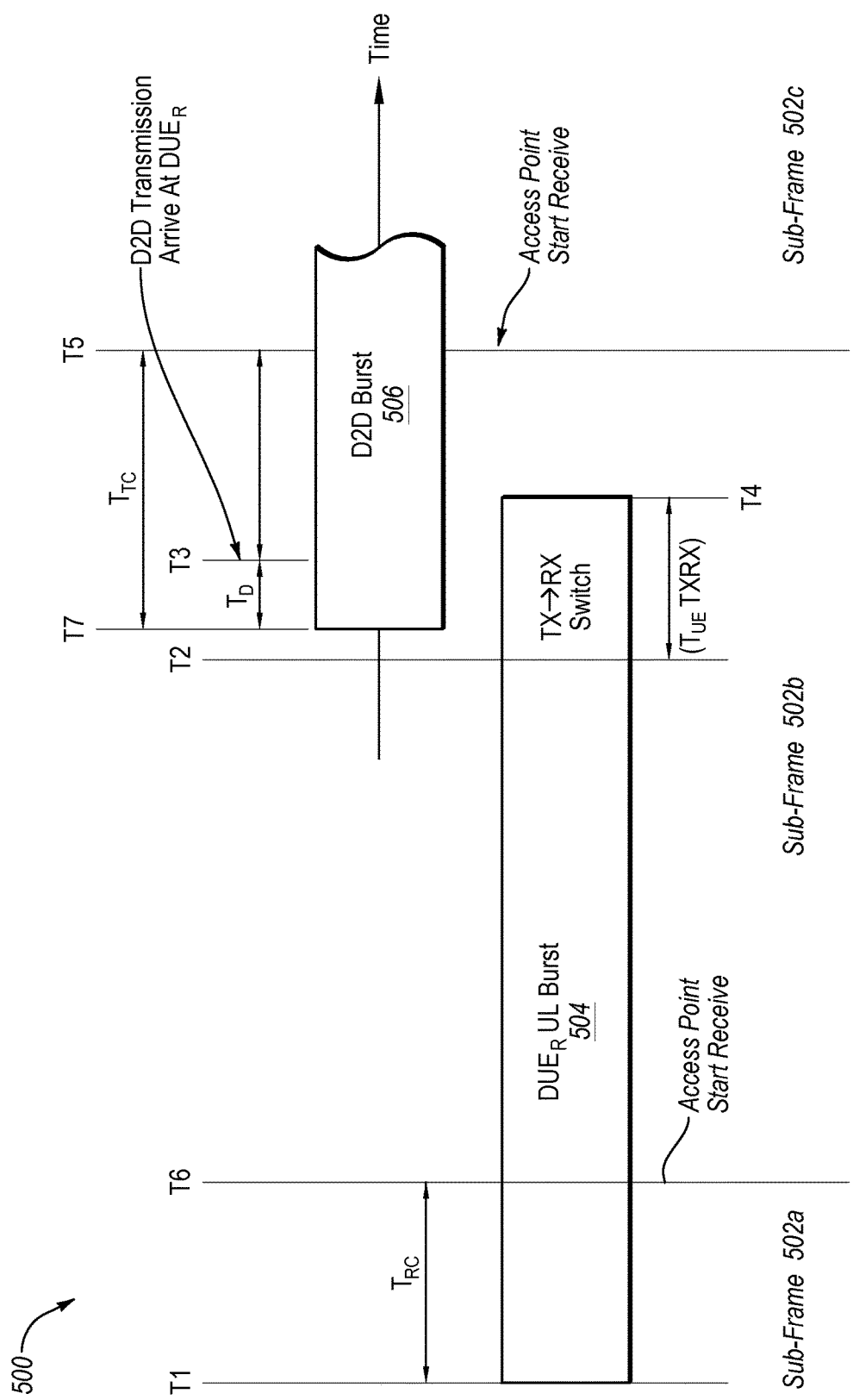
FIG. 5 illustrates a timing diagram for a D2D communication that may be received at a receiving wireless device of the D2D pair of FIG. 4.
Figure 6:
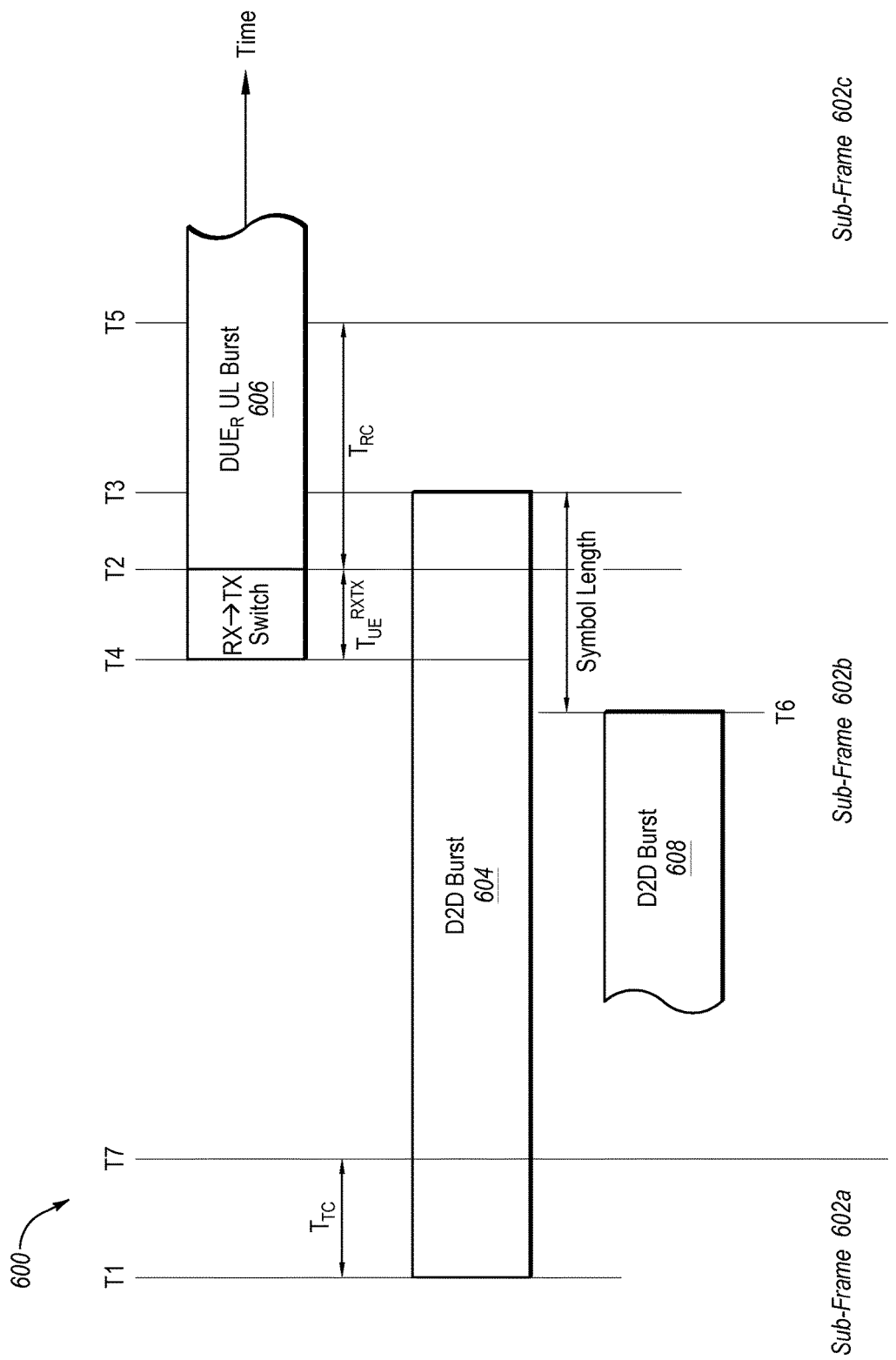
FIG. 6 illustrates another timing diagram for a D2D communication that may be received at the receiving wireless device of the D2D pair of FIG. 4.

FIG. 5 illustrates a timing diagram 500 for a D2D communication that may be received at the $DUE_R$ of FIG. 4 (not illustrated in FIG. 5), arranged in accordance with at least one embodiment described herein. The timing diagram 500 indicates D2D communications that may be received at and other communications that may be transmitted from the $DUE_R$ to an access point. The timing diagram 500 may span between three sub-frames, a sub-frame 502a, a sub-frame 502b, and a sub-frame 502c, that may be referenced with respect to the access point 402 of FIG. 4 (not illustrated in FIG. 5) communicating with the $DUE_R$. Of the sub-frames 502a, 502b, and 502c, sub-frames 502b and 502c may be uplink sub-frames. During the sub-frame 502b, the $DUE_R$ may be transmitting an uplink (UL) communication burst 504 (illustrated as "$DUE_R$ UL Burst 504" in FIG. 5) to the access point 402.

The $DUE_R$ may begin transmitting the UL communication burst 504 to the access point 402 at a time T1 during the sub-frame 502a. The time T1 may be before a time T6, which may be when the sub-frame 502b may begin and may be when the access point 402 may be expecting to receive the start of the UL communication burst 504 from the $DUE_R$. The difference between the time T1 and the time T6 may be the time adjust between the $DUE_R$ and the access point 402 and may be based on the propagation delay $T_{RC}$ (e.g., in the illustrated embodiment the time adjust between the time T1 and the time T6 may be the propagation delay $T_{RC}$). The $DUE_R$ may transmit the UL communication burst 504 to the access point 402 until a time T2. The time between T1 and T2 may be approximately a duration of a sub-frame 502 and may be time shifted by the time adjust between the $DUE_R$ and the access point 402 to account for the propagation delay $T_{RC}$ between the $DUE_R$ and the access point 402.

Additionally, the $DUE_T$ may be scheduled to transmit a D2D communication burst 506 (illustrated as "D2D Burst 506" in FIG. 5) to the $DUE_R$ during the sub-frame 502c. To receive the D2D communication burst 506 from the $DUE_T$ during the sub-frame 502c, the $DUE_R$ may switch from a transmitting mode to a receiving mode. As mentioned above, the $DUE_R$ may be transmitting to the access point 402 until time T2. At time T2, the $DUE_R$ may begin switching from a transmitting mode to a receiving mode. "$T_{UE}^{TXRX}$" in FIG. 5 illustrates the time that may pass for the $DUE_R$ to switch from the transmitting mode to the receiving mode. As such, the $DUE_R$ may not be available to receive a D2D communication from the $DUE_T$ (e.g., the D2D communication burst 506) until after $T_{UE}^{TXRX}$ has passed at a time T4, due to the time to switch from the transmitting mode to the receiving mode.

The $DUE_T$ may be configured to begin transmitting the D2D communication burst 506 based on the start of the sub-frame 502c and the propagation delay between the $DUE_T$ and the access point 402 ($T_{TC}$), which may indicate the associated time adjust between the $DUE_T$ and the access point 402. Accordingly, the $DUE_T$ may begin transmitting the D2D communication burst 506 at a time T7 based on the start of the sub-frame 502c at a time T5 and the propagation delay $T_{TC}$—which may be approximately equal to T5 minus T 7. However, the propagation delay $T_D$ between the $DUE_T$ and the $DUE_R$ may be less than the propagation delay $T_{TC}$ between the $DUE_T$ and the access point 402. As a result, the D2D communication burst 506 may arrive at the $DUE_R$ at a time T3 (which may be within a time frame in which the $DUE_R$ may expect to receive the D2D communication burst 506 based on an estimated arrival time of the D2D communication burst 506 as described above). However, in the illustrated embodiment, the time T3 may be before the time T4, which may be the time when the $DUE_R$ may finish switching from the transmitting mode to the receiving mode. As a result, the $DUE_R$ may have a timing conflict because the $DUE_R$ may not be ready to receive the D2D communication burst 506 when it arrives at the time T3.

Therefore, in some embodiments, the timing conflict experienced by the $DUE_R$ may be predicted by the access point 402. For example, the access point 402 may predict that a timing conflict may be experienced by the $DUE_R$ when the access point 402 schedules the $DUE_R$ to transmit a UL communication, such as the UL communication burst 504 in a first sub-frame, e.g., the sub-frame 502b, and schedules the $DUE_R$ to receive a D2D communication, such as the D2D communication burst 506, from the $DUE_T$ in a subsequent sub-frame, e.g., the sub-frame 502c, and the propagation delay $T_D$ is less than the $T_{UE}^{TXRX}$ for the $DUE_R$.

In some embodiments, to resolve the timing conflict, the access point 402 may instruct the $DUE_T$ to adjust the D2D communication burst 506. For example, in some embodiments, the access point 402 may instruct the $DUE_T$ to not provide a symbol during the conflicted time when the $DUE_R$ is unavailable to receive D2D communications from the $DUE_T$. For example, the access point 402 may instruct the $DUE_T$ to not provide one or more symbols at the start of the D2D communication burst 506 for at least the duration of the difference between the time T4 and the time T3. The access point 402 may also indicate to the $DUE_R$ not to expect one or more symbols during this conflicted time. Thus, the D2D communication may be shortened by one or more symbols.

Alternately or additionally, the access point 402 may also indicate to the $DUE_T$ to mute transmission during the conflicted time, essentially instructing the $DUE_T$ to wait to transmit the D2D burst 506. For example, the access point 402 may instruct the $DUE_T$ to wait to transmit the D2D communication burst 506 for at least the duration of the difference between the time T4 and the time T3. Alternately or additionally, the access point 402 may instruct the $DUE_T$ to not include information in one or more of the symbols at the start of the D2D communication burst 506 and may indicate to the $DUE_R$ that the symbols may be null.

Alternately or additionally, when the $DUE_R$ timing conflict affects a part of the first symbol of the D2D communication burst 506 but not all of it, the access point 402 may have the $DUE_R$ and $DUE_T$ compensate for the timing conflict by instructing the $DUE_T$ to construct the first symbol such that the $DUE_R$ may decode the first symbol using fewer samples of the first symbol. In these and other embodiments, the access point 402 may inform the $DUE_R$ that the first symbol of the D2D communication burst 506 may be reconstructed with fewer samples. In some embodiments, the $DUE_R$ may sample using a Fourier transform to decode the first symbol with fewer samples. The delay in transmission, the number of symbols dropped or treated as null, or the reduced sampling of the first symbol may be based on any one of or combination of the duration of each symbol, the propagation delay $T_{TC}$, the propagation delay $T_D$, and the transition time $T_{UE}^{TXRX}$.

FIG. 6 illustrates a timing diagram 600 for a D2D communication that may be received at the $DUE_R$ of FIG. 4 (not illustrated in FIG. 6), arranged in accordance with at least one embodiment described herein. The timing diagram 600 may show communications transmitted from and received at the $DUE_R$. The timing diagram 600 may span between three sub-frames, a sub-frame 602a, a sub-frame 602b, and a sub-frame 602c, referenced to the access point 402 (not illustrated in FIG. 6) communicating with the $DUE_R$. Of the sub-frames 602a, 602b, and 602c, sub-frames 602b and 602c may be uplink sub-frames. During sub-frame 602b, which may begin at a time T7, the $DUE_R$ may be receiving a D2D communication burst 604 (illustrated as "D2D Burst 604" in FIG. 6) from the $DUE_T$ of FIG. 4 (not illustrated in FIG. 6). The D2D communication burst 604 transmitted to the $DUE_R$ from the $DUE_T$ may arrive at the $DUE_R$ at a time T1 within the sub-frame 602a and may continue until a time T3. In some embodiments, the D2D communication burst 604 may begin during the sub-frame 602a at time T1, which is before time T7 based on the time adjust "$T_{TC}$" of the $DUE_T$ with respect to the access point 402, as explained above. Additionally, the $DUE_R$ may estimate that the D2D communication burst 604 may arrive at the $DUE_R$ at approximately time T1 based on an estimated arrival time of the D2D communication burst 604 that may be determined as described above.

The $DUE_R$ may also be scheduled (e.g., by the access point 402) to transmit a UL communication burst 606 (illustrated as "$DUE_R$ UL Burst 606" in FIG. 6) to the access point 402 during the sub-frame 602c. The $DUE_R$ may begin transmitting the UL communication burst 606 to the access point 402 at time T2 based on the time adjust "$T_{RC}$" of the $DUE_R$ with respect to the access point 402 so that the access point 402 receives the UL communication burst 606 at a time T5. The time T5 may be the beginning of the sub-frame 602c and may accordingly be the time the access point 402 may be expecting to receive communications from the $DUE_R$.

To allow the $DUE_R$ to transmit to the access point 402 at the time T2, the $DUE_R$ may switch from receiving mode to transmitting mode starting at a time T4 such that a receiving mode to transmitting mode transition time "$T_{UE}^{RXTX}$" may pass before the $DUE_R$ begins transmitting the UL communication burst 606 at the time T2. However, the time T4 may be before the time T3, which is the time that the D2D communication burst 604 transmitted to the $DUE_R$ from the $DUE_T$ finishes. To allow the $DUE_R$ to provide the UL communication burst 606 to the access point 402 at the time T5, the $DUE_R$ may begin switching to transmitting mode while the D2D communication burst 604 from the $DUE_T$ is still arriving at the $DUE_R$. As a result, the $DUE_R$ may have a timing conflict and may not receive a portion of the D2D communication burst 604 that may arrive at the $DUE_R$ after the time T4 when the $DUE_R$ may begin switching from receiving mode to transmitting mode.

In some embodiments, this timing conflict experienced by the $DUE_R$ may be predicted by the access point 402. For example, the timing conflict may be predicted by the access point 402 when the access point 402 schedules the $DUE_R$ to receive the D2D communication burst 604 from the $DUE_T$ in the sub-frame 602b and also schedules the $DUE_R$ to transmit the UL communication burst 606 in the sub-frame 602c. In some embodiments, to resolve the timing conflict, the access point 402 may instruct the $DUE_T$ to not provide a symbol or part of a symbol during the timing conflict. The access point 402 may also indicate to the $DUE_R$ not to expect a symbol after the time T4. Thus, the communication may be shortened by one or more symbols depending on the timing conflict.

For example, in some embodiments, the length of a symbol within the D2D communication burst 604 may be greater than the duration of the difference between the time T3 and the time T4. As such, the access point 402 may indicate to the $DUE_T$ to mute transmission during the timing conflict by cutting the communication short by one symbol. Accordingly, the $DUE_T$ may transmit a truncated D2D communication burst 608 (illustrated as "D2D Burst 608" in FIG. 6), which may stop at a time T6 before the time T4 based on the symbol length. The access point 402 may also indicate to the $DUE_R$ that this may occur such that the $DUE_R$ may expect to receive the truncated D2D communication burst 608 instead of the communication burst 604.

Alternately or additionally, the access point 402 may instruct the $DUE_T$ to not include information in the last symbol of the D2D communication burst 604 and may indicate to the $DUE_R$ that the last symbol of the D2D communication burst 604 may be null. Alternately or additionally, the access point 402 may instruct the $DUE_T$ to truncate or include null information in only a portion of the last symbol of the D2D communication burst 604, depending on when the time T4 may occur. Further, the access point 402 may instruct the $DUE_T$ to truncate or include null information in more than one of the latter symbols of the D2D communication burst 604, depending on when the time T4 may occur. Additionally, in some embodiments, the access point 402 may instruct the $DUE_T$ to begin transmitting the D2D communication burst 604 such that the D2D communication burst 604 arrives before the time T1 to allow for the last of the D2D communication burst 604 to arrive at the $DUE_R$ before the time T4.

Referring again to FIG. 4, a general flow of compensating for timing conflicts experienced by the $DUE_R$ in uplink sub-frames is now described. The access point 402 may determine the sub-frames for a communication frame that may be associated with UL and D2D communications. The access point 402 may indicate the sub-frames to the $DUE_R$ and $DUE_T$ during scheduling of the UL and D2D communications. When the access point 402 determines that a timing conflict may occur as discussed above, the access point 402 may direct the $DUE_T$ to manipulate the D2D communication being sent to the $DUE_R$ to compensate for the timing conflict. The access point 402 may further indicate to the $DUE_R$ how the D2D communication may be manipulated by the $DUE_T$ to compensate for the timing conflict. In this manner, the network 400 may allow for D2D communications between the $DUE_R$ and the $DUE_T$ to occur during uplink sub-frames and may also resolve potential timing conflicts.

Modifications, additions, or omissions may be made to the elements and methods described above with respect to FIGS. 1-6 without departing from the scope of the present disclosure. For example, the modification of D2D communication bursts and their associated symbols and symbol lengths may vary depending on specific situations. For example, in a scenario such as that described with respect to FIG. 6, the overall length of the information included in the D2D communication burst 604 may be reduced using any applicable methodology such that the $DUE_R$ may not receive any relevant information after the $DUE_R$ has begun transitioning from a receiving mode to a transmitting mode.

Figure 7:
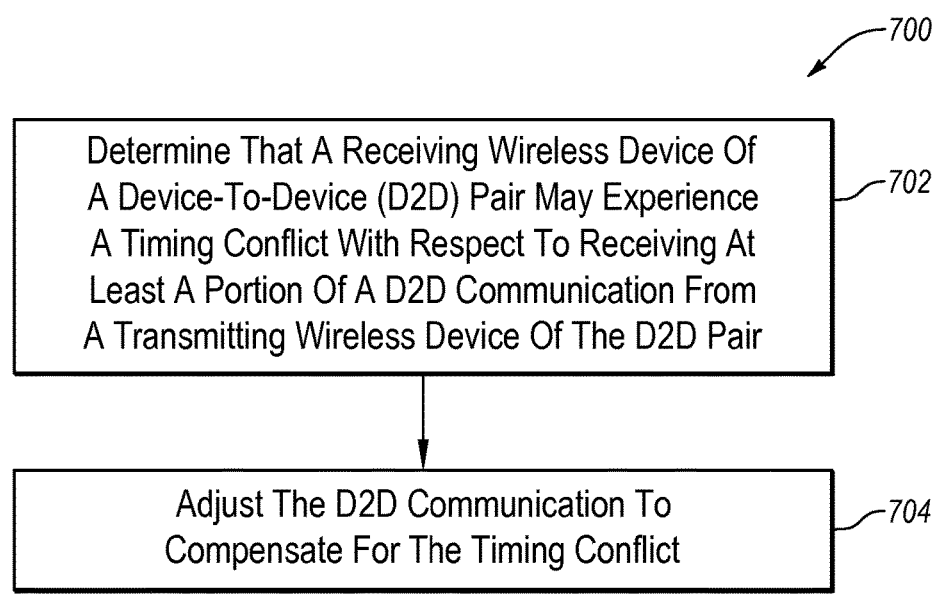
FIG. 7 is a flowchart of an example method of compensating for transmitting to multiple devices during D2D communications.

FIG. 7 is a flowchart of an example method 700 of compensating for transmitting to multiple devices D2D communications, arranged in accordance with at least one embodiment described herein. The method 700 may be implemented, in some embodiments, by a wireless communication network, such as the networks 100 and 400 described with respect to FIGS. 1 and 4, respectively. Although illustrated as discrete blocks, various blocks may be divided into additional blocks, combined into fewer blocks, or eliminated, depending on the desired implementation.

The method 700 may begin, and at a block 702, it may be determined that a receiving wireless device of a D2D pair (e.g., the $DUE_R$ of FIG. 4) may experience a timing conflict with respect to receiving at least a portion of a D2D communication transmitted by a transmitting wireless device of the D2D pair (e.g., the $DUE_T$ of FIG. 4) while the receiving wireless device is transitioning between a transmitting mode and a receiving mode. In some embodiments, transmission and/or reception of the D2D communication may be scheduled based on a time adjust associated with the transmitting wireless device and an access point. Additionally, in some embodiments, it may be determined that the receiving wireless device may experience the timing conflict while transitioning from the receiving mode to the transmitting mode. In these or other embodiments, it may be determined that the receiving wireless device may experience the timing conflict while transitioning from the transmitting mode to the receiving mode.

At block 704, the D2D communication may be adjusted to compensate for the timing conflict. In some embodiments adjusting the D2D communication to compensate for the timing conflict may include adjusting a symbol within the D2D communication. In these or other embodiments, adjusting the D2D communication may include dropping one or more symbols of the D2D communication, including null information in the one or more symbols of the D2D communication, adjusting timing of the one or more symbols, reducing sampling reconstruction of the symbols and/or reducing a length of the one or more symbols of the D2D communication. In some embodiments, the above-listed operations may be performed on one or more of the first or last symbols of the D2D communication.

Additionally, in these or other embodiments, adjusting the D2D communication to compensate for the timing conflict may include delaying transmission of the D2D communication or advancing transmission of the D2D communication. Further, in some embodiments adjusting the D2D communication may include adjusting a first portion of the D2D communication based on the receiving wireless device transitioning from the transmitting mode to the receiving mode or adjusting a last portion of the D2D communication based on the receiving wireless device transitioning from the transmitting mode to the receiving mode. Also, adjusting the D2D communication may include the access point instructing the transmitting wireless device to adjust the D2D communication and the transmitting wireless device adjusting the D2D communication.

Accordingly, the method 700 may be performed to compensate for timing conflicts that may occur with respect to D2D communications. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, an access point, a receiving wireless device of a D2D pair (e.g., the $DUE_R$ of FIG. 4) and/or a transmitting wireless device of a D2D pair (e.g., the $DUE_T$ of FIG. 4) may perform the one or more actions and functions described herein using specific hardware implementations or using hardware such as computer-readable media having computer-executable instructions or data structures stored thereon in the form of software, or some combination of hard-coded hardware and computer-readable media including software. Such computer-readable media may be any available media that may be accessed by a general purpose or special purpose computer. By way of example, and not limitation, such computer-readable media may comprise tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a processor, a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of compensating for transmitting to multiple devices during device-to-device (D2D) communications, the method comprising:
    determining that a receiving wireless device of a device-to-device (D2D) pair may experience a timing conflict with respect to receiving at least a portion of a D2D communication transmitted by a transmitting wireless device of the D2D pair while the receiving wireless device is transitioning between a transmitting mode and a receiving mode, the D2D communication transmitted by the transmitting wireless device to the receiving wireless device and to an access point configured to communicate with both the transmitting wireless device and the receiving wireless device, a transmission time of the D2D communication adjusted for transmission of the D2D communication to the access point, the transmission of the D2D communication to the access point occurring at least partially during a transition period between the transmitting mode and the receiving mode of the receiving wireless device; and
    adjusting the D2D communication to compensate for the timing conflict, adjusting the D2D communication including one or more of: dropping one or more symbols of a subframe of the D2D communication while transmitting remaining symbols of the subframe of the D2D communication, including null information in the one or more symbols of the subframe of the D2D communication, adjusting a timing of transmission of the one or more symbols within the subframe of the D2D communication, and constructing the one or more symbols of the D2D communication to be decoded with fewer samples than other symbols of the D2D communication.

2. The method of claim 1, wherein dropping one or more symbols of a subframe of the D2D communication while transmitting remaining symbols of the subframe of the D2D communication comprises one or more of: dropping a last symbol of the D2D communication and dropping a first symbol of the D2D communication.

3. The method of claim 1, wherein including null information in the one or more symbols of the subframe of the D2D communication comprises one or more of: including null information in a first symbol of the D2D communication and including null information in a last symbol of the D2D communication.

4. The method of claim 1, wherein adjusting the D2D communication to compensate for the timing conflict further comprises one or more of: reducing a length of a first symbol of the D2D communication and reducing a length of a last symbol of the D2D communication.

5. The method of claim 1, wherein adjusting a timing of transmission of the one or more symbols within the subframe of the D2D communication comprises delaying transmission of the D2D communication or advancing transmission of the D2D communication.

6. The method of claim 1, further comprising:
    determining that the receiving wireless device will experience the timing conflict while the receiving wireless device is transitioning from the transmitting mode to the receiving mode; and
    adjusting a first portion of the D2D communication based on the receiving wireless device transitioning from the transmitting mode to the receiving mode.

7. The method of claim 1, further comprising:
    determining that the receiving wireless device will experience the timing conflict while the receiving wireless device is transitioning from the receiving mode to the transmitting mode; and
    adjusting a last portion of the D2D communication based on the receiving wireless device transitioning from the receiving mode to the transmitting mode.

8. The method of claim 1, wherein adjusting the D2D communication to compensate for the timing conflict comprises a wireless communication network access point instructing the transmitting wireless device to adjust the D2D communication.

9. The method of claim 1, wherein adjusting the D2D communication to compensate for the timing conflict comprises the transmitting wireless device adjusting the D2D communication.

10. The method of claim 1, further comprising scheduling transmission and reception of the D2D communication based on a time adjust associated with the transmitting wireless device and the access point.

11. One or more non-transitory computer readable media that includes instructions that when executed by one or more computing systems cause the one or more computing systems to perform operations associated with compensating for transmitting to multiple devices during device-to-device (D2D) communications, the operations comprising:
    determining that a receiving wireless device of a device-to-device (D2D) pair may experience a timing conflict with respect to receiving at least a portion of a D2D communication transmitted by a transmitting wireless device of the D2D pair while the receiving wireless device is transitioning between a transmitting mode and a receiving mode, the D2D communication transmitted by the transmitting wireless device to the receiving wireless device and to an access point configured to communicate with both the transmitting wireless device and the receiving wireless device, a transmission time of the D2D communication adjusted for transmission of the D2D communication to the access point, the transmission of the D2D communication to the access point occurring at least partially during a transition period between the transmitting mode and the receiving mode of the receiving wireless device; and adjusting the D2D communication to compensate for the timing conflict, adjusting the D2D communication including one or more of: dropping one or more symbols of a subframe of the D2D communication while transmitting remaining symbols of the subframe of the D2D communication, including null information in the one or more symbols of the subframe of the D2D communication, adjusting a timing of transmission of the one or more symbols within the subframe of the D2D communication, and constructing the one or more symbols of the D2D communication to be decoded with fewer samples than other symbols of the D2D communication.

12. The one or more non-transitory computer readable media of claim 11, wherein dropping one or more symbols of a subframe of the D2D communication while transmitting remaining symbols of the subframe of the D2D communication comprises one or more of: dropping a last symbol of the D2D communication and dropping a first symbol of the D2D communication.

13. The one or more non-transitory computer readable media of claim 11, wherein including null information in the one or more symbols of the subframe of the D2D communication comprises one or more of: including null information in a first symbol of the D2D communication and including null information in a last symbol of the D2D communication.

14. The one or more non-transitory computer readable media of claim 11, wherein adjusting a timing of transmission of the one or more symbols within the subframe of the D2D communication comprises one or more of:
  reducing a length of a first symbol of the D2D communication;
  reducing a length of a last symbol of the D2D communication; and
  delaying transmission of the D2D communication or advancing transmission of the D2D communication.

15. The one or more non-transitory computer readable media of claim 11, wherein the operations further comprise:
  determining that the receiving wireless device will experience the timing conflict while the receiving wireless device is transitioning from the transmitting mode to the receiving mode; and
  adjusting a first portion of the D2D communication based on the receiving wireless device transitioning from the transmitting mode to the receiving mode.

16. The one or more non-transitory computer readable media of claim 11 wherein the operations further comprise:
  determining that the receiving wireless device will experience the timing conflict while the receiving wireless device is transitioning from the receiving mode to the transmitting mode; and
  adjusting a last portion of the D2D communication based on the receiving wireless device transitioning from the receiving mode to the transmitting mode.

* * * * *